United States Patent
Hashimoto et al.

(10) Patent No.: US 11,092,103 B2
(45) Date of Patent: Aug. 17, 2021

(54) STATE DETERMINATION DEVICE FOR INTERNAL COMBUSTION ENGINE, STATE DETERMINATION SYSTEM FOR INTERNAL COMBUSTION ENGINE, DATA ANALYSIS DEVICE, AND CONTROL DEVICE FOR INTERNAL COMBUSTION ENGINE

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/922,294

(22) Filed: Jul. 7, 2020

(65) Prior Publication Data
US 2021/0062746 A1 Mar. 4, 2021

(30) Foreign Application Priority Data
Aug. 30, 2019 (JP) .............................. JP2019-157750

(51) Int. Cl.
*F02D 41/14* (2006.01)
*G01M 15/05* (2006.01)
(Continued)

(52) U.S. Cl.
CPC ....... *F02D 41/1498* (2013.01); *F02D 41/009* (2013.01); *F02D 41/1454* (2013.01);
(Continued)

(58) Field of Classification Search
CPC ............. F02D 41/1498; F02D 41/2406; F02D 41/1454; F02D 41/22; F02D 41/009; F02D 2200/101; G01M 15/05
See application file for complete search history.

(56) References Cited

U.S. PATENT DOCUMENTS

| | | | |
|---|---|---|---|
| 5,093,792 A | 3/1992 | Taki et al. | |
| 2008/0033630 A1* | 2/2008 | Lee | G08G 1/0104 701/117 |

(Continued)

FOREIGN PATENT DOCUMENTS

| | | |
|---|---|---|
| JP | 01-301946 A | 12/1989 |
| JP | 04-091348 A | 3/1992 |

(Continued)

*Primary Examiner* — Joseph J Dallo
(74) *Attorney, Agent, or Firm* — Oblon, McClelland, Maier & Neustadt, L.L.P.

(57) ABSTRACT

Provided is a state determination device for an internal combustion engine. The state determination device includes a storage device, and an execution device. The storage device stores mapping data that is data defining a mapping that outputs a determination result of a state of the internal combustion engine, by using an internal combustion engine state variable as an input. The execution device executes an acquisition process of acquiring the internal combustion engine state variable each time a crankshaft rotates by a specified angle, and a determination process of determining the state of the internal combustion engine based on an output of the mapping using the internal combustion engine state variable as an input. The execution device omits a part of the determination process performed each time the crankshaft rotates by the specified angle when a rotation speed of the crankshaft becomes equal to or higher than a predetermined threshold.

8 Claims, 10 Drawing Sheets

(51) Int. Cl.
*F02D 41/24* (2006.01)
*F02D 41/22* (2006.01)
*F02D 41/00* (2006.01)

(52) U.S. Cl.
CPC ......... *F02D 41/22* (2013.01); *F02D 41/2406* (2013.01); *G01M 15/05* (2013.01); *F02D 2200/101* (2013.01)

(56) References Cited

U.S. PATENT DOCUMENTS

| | | | | |
|---|---|---|---|---|
| 2009/0308145 | A1* | 12/2009 | Suzuki | B60L 50/61 |
| | | | | 73/114.04 |
| 2009/0319157 | A1* | 12/2009 | Ishizuka | F02D 41/2474 |
| | | | | 701/106 |
| 2010/0168989 | A1* | 7/2010 | Gao | F02D 41/2429 |
| | | | | 701/110 |
| 2013/0311056 | A1* | 11/2013 | Shinojima | F16H 61/66 |
| | | | | 701/58 |
| 2017/0370319 | A1* | 12/2017 | Homant | F02D 41/083 |
| 2018/0114110 | A1* | 4/2018 | Han | G06N 3/063 |
| 2019/0377930 | A1* | 12/2019 | Chen | G06K 9/6262 |

FOREIGN PATENT DOCUMENTS

| | | |
|---|---|---|
| JP | 10-252536 A | 9/1998 |
| JP | 2009-019523 A | 1/2009 |
| JP | 2018-178810 A | 11/2018 |
| JP | 2019-019755 A | 2/2019 |
| JP | 6547991 B1 | 7/2019 |

\* cited by examiner

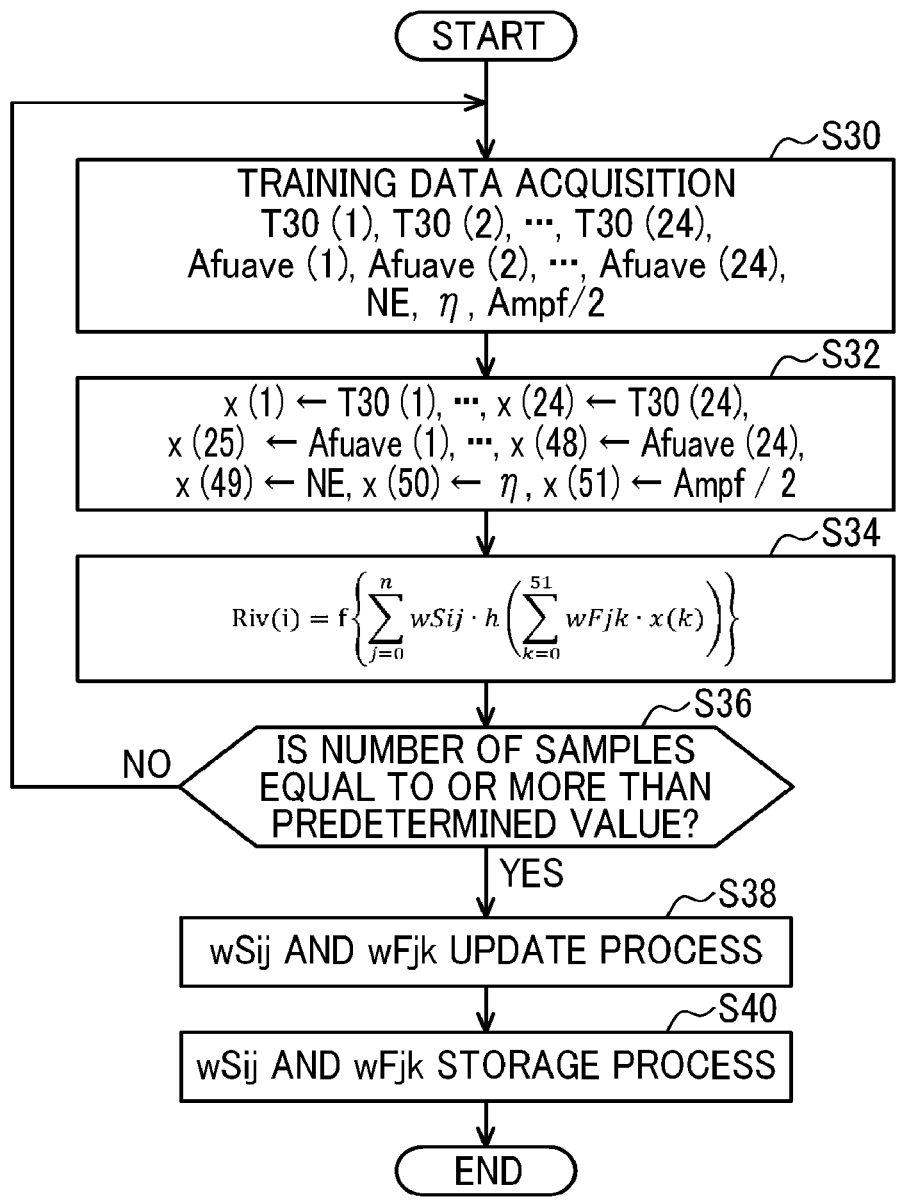

STATE DETERMINATION DEVICE FOR INTERNAL COMBUSTION ENGINE, STATE DETERMINATION SYSTEM FOR INTERNAL COMBUSTION ENGINE, DATA ANALYSIS DEVICE, AND CONTROL DEVICE FOR INTERNAL COMBUSTION ENGINE

INCORPORATION BY REFERENCE

The disclosure of Japanese Patent Application No. 2019-157750 filed on Aug. 30, 2019 including the specification, drawings and abstract is incorporated herein by reference in its entirety.

BACKGROUND

1. Technical Field

The disclosure relates to a state determination device for an internal combustion engine, a state determination system for an internal combustion engine, a data analysis device, and a control device for an internal combustion engine.

2. Description of Related Art

In a misfire detection system disclosed in Japanese Unexamined Patent Application Publication No. 4-91348 (JP 4-91348 A), a hierarchical neural network model configured to input, to an input layer, time-series data of a rotation speed of a crankshaft of an internal combustion engine sampled at each specified cycle and output information on a cylinder in which a misfire has occurred from an output layer is used. The hierarchical neural network model has been subjected to supervised learning.

SUMMARY

In the misfire detection system as disclosed in JP 4-91348 A, a frequency of detecting a misfire increases as the rotation speed of the crankshaft increases. Therefore, when the rotation speed of the crankshaft is high, there is a possibility that the calculation load on a device by the hierarchical neural network model becomes large. The same problem may occur not only in the detection of a misfire but also in a case of performing detection or calculation each time the crankshaft rotates by a specified angle by using a hierarchical neural network model.

A first aspect of the disclosure relates to a state determination device for an internal combustion engine. The state determination device includes a storage device and an execution device. The storage device is configured to store mapping data that is data defining a mapping that outputs a determination result of a state of the internal combustion engine, by using an internal combustion engine state variable that is a parameter indicating the state of the internal combustion engine as an input. The execution device is configured to execute an acquisition process of acquiring the internal combustion engine state variable each time a crankshaft of the internal combustion engine rotates by a specified angle, and a determination process of determining the state of the internal combustion engine based on an output of the mapping using the internal combustion engine state variable as an input. The mapping data is data that has been learned by machine learning. The execution device is configured to omit a part of the determination process performed each time the crankshaft rotates by the specified angle when a rotation speed of the crankshaft becomes equal to or higher than a predetermined threshold.

According to the first aspect, when a rotation speed of the crankshaft becomes equal to or higher than a predetermined threshold, a frequency of executing the determination process is reduced by omitting a part of the determination process performed each time the crankshaft rotates by the specified angle. The calculation load on the execution device is reduced as compared with the case where the determination process is performed without changing the frequency. Therefore, it is not needed to employ a high-performance and high-cost execution device assuming that the rotation speed of the crankshaft is high.

In the state determination device according to the first aspect, the internal combustion engine may include a plurality of cylinders, an air-fuel ratio sensor that detects an air-fuel ratio on a downstream side of a combustion chamber, and a sensor that detects a rotation behavior of the crankshaft. The state of the internal combustion engine may be a variation in air-fuel ratio among the cylinders. The execution device may be configured to execute a coping process for coping with a large degree of the variation in air-fuel ratio by operating predetermined hardware when determination is made that the air-fuel ratio among the cylinders has varied by the determination process. The mapping data may be data defining a mapping that outputs an imbalance variable that is a variable indicating a degree of variation among actual air-fuel ratios when a fuel injection valve is operated to control air-fuel ratios of air-fuel mixtures in the respective cylinders to be equal to each other by using, as an input, a rotation waveform variable and an air-fuel ratio detection variable that is a variable corresponding to an output of the air-fuel ratio sensor at each of a plurality of first intervals. The execution device may be configured to acquire the rotation waveform variable and the air-fuel ratio detection variable at each of the first intervals based on a detection value of the sensor that detects a rotation behavior of the crankshaft, in the acquisition process. The rotation waveform variable may be a variable indicating a difference among instantaneous speed variables that are variables corresponding to the rotation speed of the crankshaft at each of a plurality of second intervals. Both the first interval and the second interval may be angle intervals of the crankshaft smaller than an appearance interval of a compression top dead center. The rotation waveform variable and a plurality of the air-fuel ratio detection variables that are used as an input of the mapping may be time-series data within a predetermined angle interval larger than the appearance interval.

According to the first aspect, the state determination device for the internal combustion engine can be applied to determining the variation in air-fuel ratio among the cylinders as the state of the internal combustion engine. Then, when determination is made that the variation in air-fuel ratio among the cylinders has occurred, a coping process for coping with occurrence of the variation can be executed.

In the state determination device according to the first aspect, the state of the internal combustion engine may be a presence or absence of a misfire of the internal combustion engine. The execution device may be configured to execute a coping process for coping with occurrence of a misfire by operating predetermined hardware when determination is made that the misfire has occurred by the determination process. The mapping data may be data defining a mapping that outputs a probability that the misfire has occurred in the internal combustion engine by using, as an input, time-series data that is an instantaneous speed parameter at each of a plurality of continuous fourth intervals included in a third interval. The execution device may be configured to acquire the instantaneous speed parameter based on a detection value of a sensor that detects a rotation behavior of the crankshaft of the internal combustion engine, in the acquisition process. The instantaneous speed parameter may be a parameter corresponding to a rotation speed of the crankshaft of the internal combustion engine. The third interval may be a rotation angle interval of the crankshaft and include a compression top dead center. The fourth interval may be an interval smaller than an appearance interval of the compression top dead center. The mapping may output a probability that the misfire has occurred in at least one cylinder in which the compression top dead center appears within the third interval.

According to the first aspect, the state determination device for the internal combustion engine can be applied to determining a presence or absence of a misfire of the internal combustion engine as the state of the internal combustion engine. Then, when determination is made that the misfire has occurred, a coping process for coping with occurrence of the misfire can be executed.

A second aspect of the disclosure relates to a state determination system for an internal combustion engine. The state determination system includes the execution device and the storage device according to the first aspect. The execution device includes a first execution device and a second execution device. The first execution device is mounted on a vehicle, and is configured to execute the acquisition process, and a vehicle transmission process of transmitting data acquired by the acquisition process to an outside of the vehicle. The second execution device is disposed outside the vehicle, and is configured to execute an external reception process of receiving the data transmitted by the vehicle transmission process, and the determination process.

According to the second aspect, the calculation load of an in-vehicle device can be reduced by executing the determination process outside the vehicle.

A third aspect of the disclosure relates to a data analysis device. The data analysis device includes the second execution device and the storage device according to the second aspect.

A fourth aspect of the disclosure relates to a control device for an internal combustion engine. The control device includes the first execution device according to the second aspect.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart illustrating a procedure of a learning process of the mapping data according to the first embodiment;

DETAILED DESCRIPTION OF EMBODIMENTS

First Embodiment

Hereinafter, a first embodiment of a state determination device for an internal combustion engine will be described with reference to the drawings.

Figure 1:
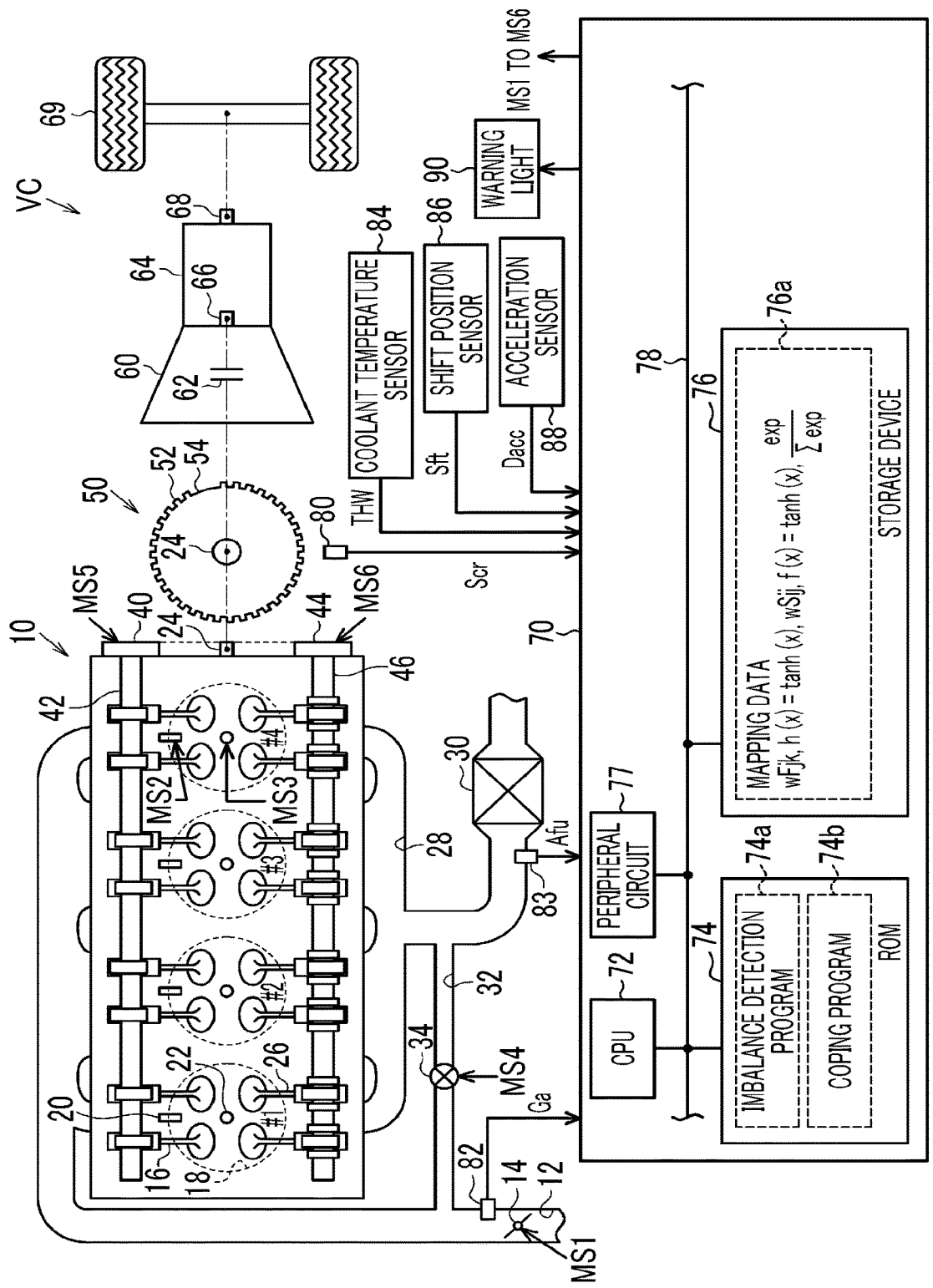
FIG. 1 is a diagram illustrating a configuration of a control device and a drive system of a vehicle according to a first embodiment.

In an internal combustion engine 10 mounted on a vehicle VC illustrated in FIG. 1, a throttle valve 14 is provided in an intake passage 12. Air sucked from the intake passage 12 flows into a combustion chamber 18 of each of cylinders #1 to #4 when an intake valve 16 opens. Fuel is injected into the combustion chamber 18 by a fuel injection valve 20. In the combustion chamber 18, an air-fuel mixture of air and fuel is provided for combustion by spark discharge from an ignition device 22, and energy generated by the combustion is taken out as rotation energy of a crankshaft 24. The air-fuel mixture provided for the combustion is discharged to an exhaust passage 28 as exhaust gas in accordance with the opening of an exhaust valve 26. The exhaust passage 28 is provided with a three-way catalyst 30 having oxygen storage capacity. The exhaust passage 28 communicates with the intake passage 12 via an exhaust gas recirculation (EGR) passage 32. The EGR passage 32 is provided with an EGR valve 34 for adjusting a flow passage cross-sectional area of the passage.

Rotation power of the crankshaft 24 is transmitted to an intake-side camshaft 42 via an intake-side variable valve timing device 40 and is transmitted to an exhaust-side camshaft 46 via an exhaust-side variable valve timing device 44. The intake-side variable valve timing device 40 changes a relative rotation phase difference between the intake-side camshaft 42 and the crankshaft 24. The exhaust-side variable valve timing device 44 changes a relative rotation phase difference between the exhaust-side camshaft 46 and the crankshaft 24.

An input shaft 66 of a transmission 64 can be connected to the crankshaft 24 of the internal combustion engine 10 via a torque converter 60. The torque converter 60 includes a lock-up clutch 62, and when the lock-up clutch 62 is engaged, the crankshaft 24 and the input shaft 66 are connected to each other. Drive wheels 69 are mechanically connected to an output shaft 68 of the transmission 64.

A crank rotor 50 provided with a plurality of (here, 34) tooth portions 52 indicating the rotation angle of the crankshaft 24 is coupled to the crankshaft 24. Although the crank rotor 50 is basically provided with the tooth portions 52 at intervals of 10° CA, one toothless portion 54 which is a place where an interval between adjacent tooth portions 52 is 30° CA is provided in the crank rotor 50. The toothless portion is for indicating the reference rotation angle of the crankshaft 24. A crank angle sensor 80 is provided near the crank rotor 50. The crank angle sensor 80 converts a change in magnetic flux according to the approach and separation of the tooth portion 52 into a pulse signal of a rectangular wave and outputs the pulse signal. In the following description, such an output signal of the crank angle sensor 80 is referred to as a crank signal Scr. In the present embodiment, the crank angle sensor 80 corresponds to a sensor that detects a rotation behavior of the crankshaft 24.

A control device 70 controls the internal combustion engine 10 and operates the throttle valve 14, the fuel injection valve 20, the ignition device 22, the EGR valve 34, the intake-side variable valve timing device 40, and the exhaust-side variable valve timing device 44 in order to control a torque, an exhaust component ratio, and the like, which are control amounts of the internal combustion engine. FIG. 1 illustrates operation signals MS1 to MS6 of the throttle valve 14, the fuel injection valve 20, the ignition device 22, the EGR valve 34, the intake-side variable valve timing device 40, and the exhaust-side variable valve timing device 44, respectively.

In controlling the control amount, the control device 70 refers to the crank signal Scr, which is an output signal of the crank angle sensor 80 that outputs a pulse at each angle interval (10° CA excluding the toothless portion 54) between the tooth portions 52, and an intake air amount Ga detected by an air flow meter 82. The control device 70 refers to an upstream detection value Afu detected by an air-fuel ratio sensor 83 provided upstream of the three-way catalyst 30 and a coolant temperature THW which is a temperature of a coolant of the internal combustion engine 10 detected by a coolant temperature sensor 84. The control device 70 refers to a shift position Sft of the transmission 64 detected by a shift position sensor 86 and an acceleration Dacc of the vehicle VC in a vertical direction, which is detected by an acceleration sensor 88.

The control device 70 includes a CPU 72, a ROM 74, a storage device 76 composed of an electrically rewritable nonvolatile memory, and a peripheral circuit 77, which can be communicated by a local network 78. The peripheral circuit 77 includes a circuit that generates a clock signal defining an internal operation, a power supply circuit, a reset circuit, and the like.

The control device 70 controls the control amount by causing the CPU 72 to execute a program stored in the ROM 74. The control device 70 executes a base injection amount calculation process of calculating a base injection amount which is a base value of a fuel amount for setting the air-fuel ratio of the air-fuel mixture in the combustion chamber 18 to the target air-fuel ratio based on a charging efficiency η. The charging efficiency η is a parameter that determines the amount of air charged into the combustion chamber 18. Specifically, in the base injection amount calculation process, for example, when the charging efficiency η is expressed as a percentage, the fuel amount per 1% of the charging efficiency η for setting the air-fuel ratio to the target air-fuel ratio is multiplied by the charging efficiency η, and thereby a process of calculating the base injection amount may be performed. The base injection amount is a fuel amount calculated for controlling the air-fuel ratio to the target air-fuel ratio based on the amount of air charged into the combustion chamber 18. Incidentally, the target air-fuel ratio may be, for example, a stoichiometric air-fuel ratio. The control device 70 calculates a requested injection amount Qd based on the base injection amount.

The control device 70 executes a process of determining a variation among actual air-fuel ratios when the fuel injection valve is operated to control air-fuel ratios of air-fuel mixtures in the respective cylinders of the internal combustion engine 10 to be equal to each other.

Figure 2:
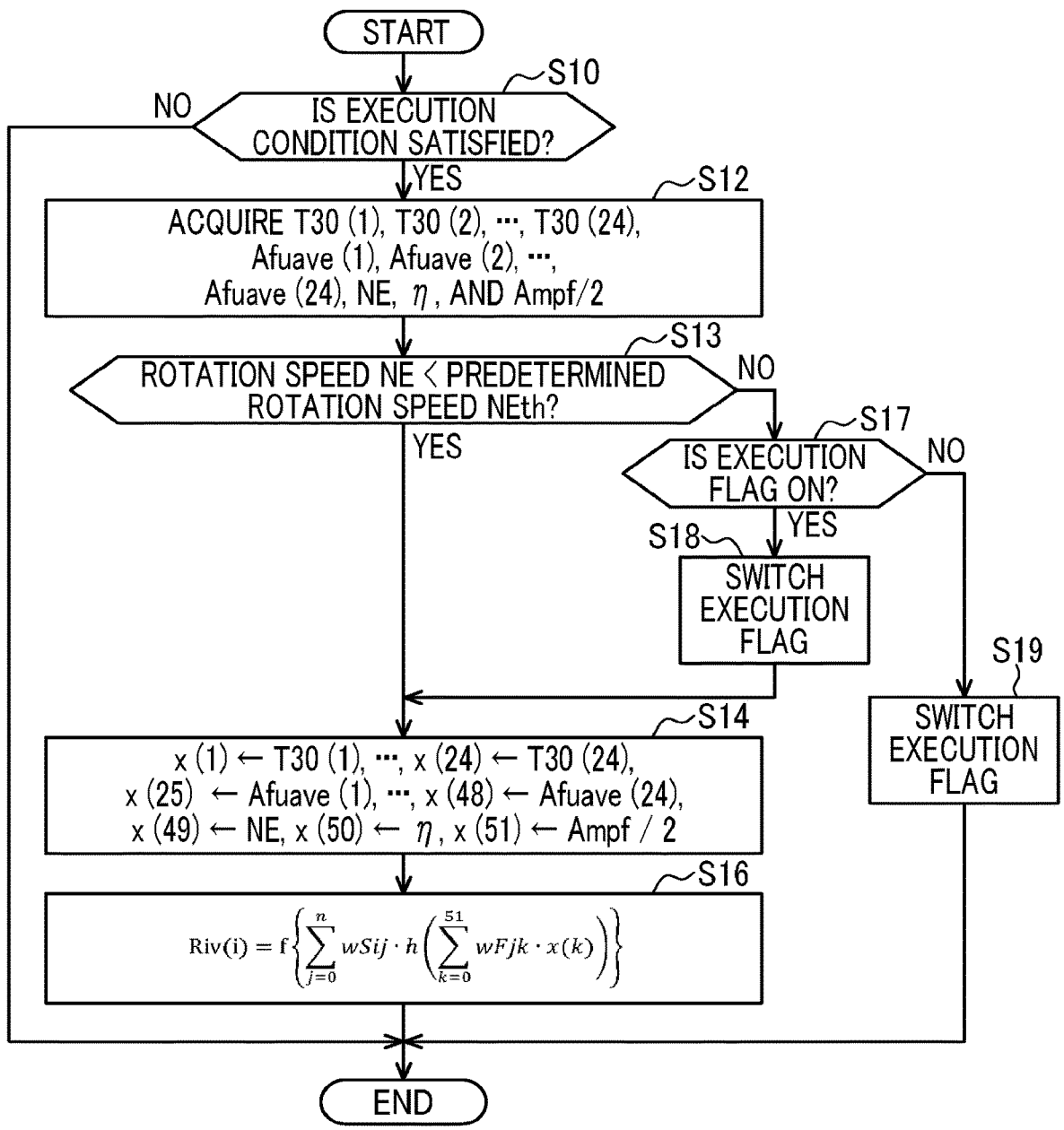
FIG. 2 is a flowchart illustrating a procedure of an imbalance determination process according to the first embodiment.

FIG. 2 illustrates a procedure of an imbalance determination process. The process illustrated in FIG. 2 is realized by the CPU 72 repeatedly executing an imbalance detection program 74a stored in the ROM 74 illustrated in FIG. 1 at a predetermined cycle, for example. In the following description, the step number of each process is represented by a number prefixed with "S".

In the series of processes illustrated in FIG. 2, the CPU 72 first determines whether or not an execution condition of an imbalance detection process is satisfied (S10). Examples of the execution condition include that the purge of the fuel vapor and the recirculation of the exhaust gas with respect to the intake air of the internal combustion engine 10 are not performed.

Next, the CPU 72 acquires minute rotation times $T30(1)$, $T30(2)$, ..., $T30(24)$, upstream average values Afuave(1), Afuave(2), ..., Afuave(24), a rotation speed NE, the charging efficiency and a 0.5th-order amplitude Ampf/2 (S12). The minute rotation time T30 is calculated by the CPU 72 measuring the time needed for the crankshaft 24 to rotate by 30° CA based on the crank signal Scr of the crank angle sensor 80. Here, when the numbers in parentheses such as the minute rotation times $T30(1)$, $T30(2)$ are different, the number indicates that rotation angle intervals are different within 720° CA which is one combustion cycle. That is, the minute rotation times $T30(1)$ to $T30(24)$ indicate the rotation time at each angle interval obtained by equally dividing the rotation angle region of 720° CA by 30° CA.

Specifically, the CPU 72 measures the time during which the crankshaft 24 rotates by 30° CA based on the crank signal Scr, and sets the time as a pre-filtering time NF30. Next, the CPU 72 calculates a post-filtering time AF30 by performing digital filtering using the pre-filtering time NF30 as an input. Then, the CPU 72 calculates the minute rotation time T30 by normalizing the post-filtering time AF30 so that the difference between the maximum value and the minimum value of the post-filtering time AF30 in a predetermined period (for example, 720° CA) becomes "1".

When m=1 to 24, the upstream average value Afuave(m) is an average value of the upstream detection values Afu at the angle interval of the same 30° CA as each minute rotation time $T30(m)$.

The rotation speed NE is calculated by the CPU 72 based on the crank signal Scr of the crank angle sensor 80, and the charging efficiency η is calculated by the CPU 72 based on the rotation speed NE and the intake air amount Ga. The rotation speed NE is an average value of the rotation speed when the crankshaft 24 rotates by an angle interval larger than an appearance interval of a compression top dead center (180° CA in the present embodiment). It is desirable that the rotation speed NE is an average value of the rotation speed when the crankshaft 24 rotates by a rotation angle equal to or more than one rotation of the crankshaft 24. Here, the average value is not limited to the simple average, and may be, for example, an exponential moving average process, and may be calculated by a plurality of sampling values such as the minute rotation time T30 when the crankshaft 24 rotates by one or more rotation angles.

The 0.5th-order amplitude Ampf/2 is an intensity of a 0.5th-order component of a rotation frequency of the crankshaft 24, and is calculated by the CPU 72 by the Fourier transform of the time-series data of the minute rotation time T30.

Next, the CPU 72 determines whether or not the rotation speed NE is lower than a predetermined rotation speed NEth (S13). Here, the predetermined rotation speed NEth is set such that the load of the calculation process based on mapping data 76a (described later) is correspondingly large with respect to the processing capacity of the CPU 72. Then, when the rotation speed NE is lower than the predetermined rotation speed NEth (S13: YES), the CPU 72 assigns the values acquired by the process of S12 to input variables x(1) to x(51) of a mapping that outputs an imbalance rate Riv (S14). Specifically, when "m=1 to 24", the CPU 72 assigns the minute rotation time T30(m) to the input variable x(m), assigns the upstream average value Afuave(m) to the input variable (24+m), assigns the rotation speed NE to the input variable x(49), assigns the charging efficiency η to the input variable x(50), and assigns the 0.5th-order amplitude Ampf/2 to the input variable x(51).

The imbalance rate Riv is a value indicating a degree of a variation among actual air-fuel ratios when the fuel injection valve is operated to control air-fuel ratios of air-fuel mixtures in the respective cylinders to be equal to each other. In the present embodiment, the imbalance rate Riv is set to "0" in the cylinder in which the target injection amount of fuel is being injected, becomes a positive value when the actual injection amount is larger than the target injection amount, and becomes a negative value when the actual injection amount is smaller than the target injection amount. That is, the CPU 72 determines that a variation in air-fuel ratio among the cylinders is larger as the imbalance rate Riv is farther from "0".

Next, the CPU 72 calculates the respective imbalance rates Riv(1) to Riv(4) of the cylinders #i (i=1 to 4) by inputting the input variables x(1) to x(51) to the mapping defined by the mapping data 76a stored in the storage device 76 illustrated in FIG. 1 (S16). Then, the CPU 72 determines that the variation in air-fuel ratio among the cylinders is larger as the calculated imbalance rate Riv is farther from "0".

In the present embodiment, the mapping includes a neural network having a single intermediate layer. The neural network includes an input-side coefficient wFjk (j=0 to n, k=0 to 51) and an activation function h(x) as an input-side nonlinear mapping that nonlinearly transforms each output of an input-side linear mapping, which is a linear mapping defined by the input-side coefficient wFjk. In the present embodiment, a hyperbolic tangent "tan h(x)" is exemplified as the activation function h(x). The neural network includes an output-side coefficient wSij (i=1 to 4, j=0 to n) and an activation function f(x) as an output-side nonlinear mapping that nonlinearly transforms each output of an output-side linear mapping, which is a linear mapping defined by the output-side coefficient wSij. In the present embodiment, the hyperbolic tangent "tan h(x)" is exemplified as the activation function f(x). The value n indicates the dimension of the intermediate layer.

When the process of S16 is completed, or when a negative determination is made in the process of S10, the CPU 72 temporarily ends the series of processes illustrated in FIG. 2. Here, when the rotation speed NE is equal to or higher than the predetermined rotation speed NEth (S13: NO), the CPU 72 determines whether or not an execution flag FE is ON (S17). The execution flag FE is switched between ON and OFF each time the CPU 72 calculates the imbalance rate Riv(i) by the mapping defined by the mapping data 76a, as described later. That is, when the execution flag FE is determined, the execution flag FE is ON once in two times, and the execution flag FE is OFF in another one of the two times.

Then, when the execution flag FE is in an ON state (S17: YES), the CPU 72 then switches the execution flag FE from the ON state to an OFF state (S18). Next, the processes of S14 and S16 described above are performed.

Meanwhile, when the execution flag FE is in the OFF state during the process of S17 (S17: NO), the CPU 72 switches the execution flag FE from the OFF state to the ON state (S19). Then, when the process of S19 is completed, the CPU 72 temporarily ends the series of processes illustrated in FIG. 2.

Figure 3:
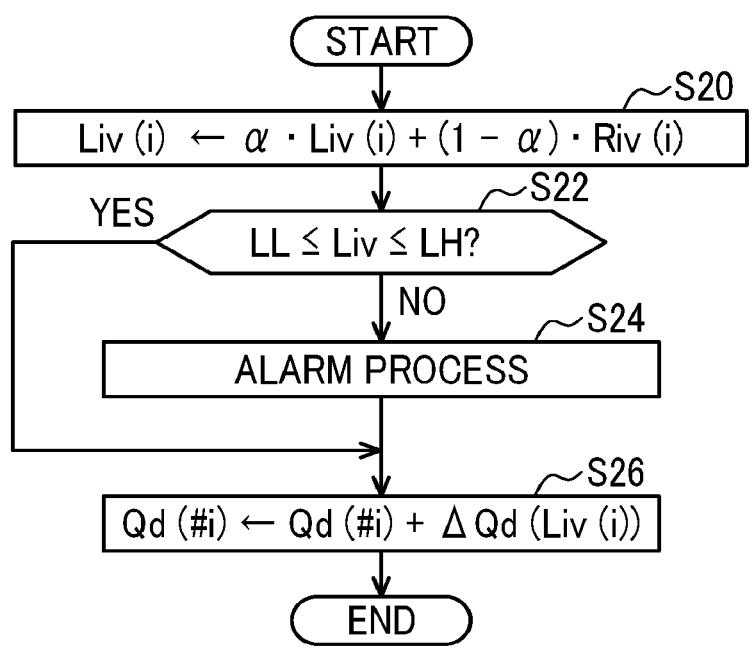
FIG. 3 is a flowchart illustrating a procedure of a coping process according to the first embodiment.

FIG. 3 illustrates a procedure of a process using the imbalance rate Riv(i). The process illustrated in FIG. 3 is realized by the CPU 72 repeatedly executing a coping program 74b stored in the ROM 74 illustrated in FIG. 1, for example, each time the imbalance rate Riv(i) is calculated.

In the series of processes illustrated in FIG. 3, the CPU 72 first updates an imbalance learning value Liv(i) by an exponential moving average process using the imbalance rate Riv(i) newly calculated by the process of FIG. 2 as an input (S20). That is, the CPU 72 updates the imbalance learning value Liv, for example, by the sum of a value obtained by multiplying the imbalance learning value Liv(i) stored in the storage device 76 by a coefficient α and a value obtained by multiplying the imbalance rate Riv(i) by "1−α" (S20). Note that "0<α<1".

Next, the CPU 72 determines whether or not the imbalance learning value Liv(i) is equal to or greater than a lean-side allowable limit LL and equal to or smaller than a rich-side allowable limit LH (S22). When determination is made that the imbalance learning value Liv(i) is smaller than the lean-side allowable limit LL or when determination is made that the imbalance learning value Liv(i) is greater than the rich-side allowable limit LH (S22: NO), the CPU 72 operates a warning light 90 illustrated in FIG. 1 to execute an alarm process in order to prompt a user for repair (S24).

Meanwhile, when determination is made that the imbalance learning value Liv(i) is equal to or greater than the lean-side allowable limit LL and equal to or smaller than the rich-side allowable limit LH (S22: YES), or when the process of S24 is completed, the CPU 72 corrects the requested injection amount Qd (#i) of each cylinder (S26). That is, the CPU 72 adds a correction amount ΔQd (Liv(i)) corresponding to the imbalance learning value Liv(i) to the requested injection amount Qd (#i) of each cylinder, thereby correcting the requested injection amount Qd (#i). Here, the correction amount ΔQd (Liv(i)) has a negative value when the imbalance learning value Liv(i) is greater than zero, and has a positive value when the imbalance learning value Liv(i) is smaller than zero. When the imbalance learning value Liv(i) is zero, the correction amount ΔQd (Liv(i)) is also zero.

Figure 4:
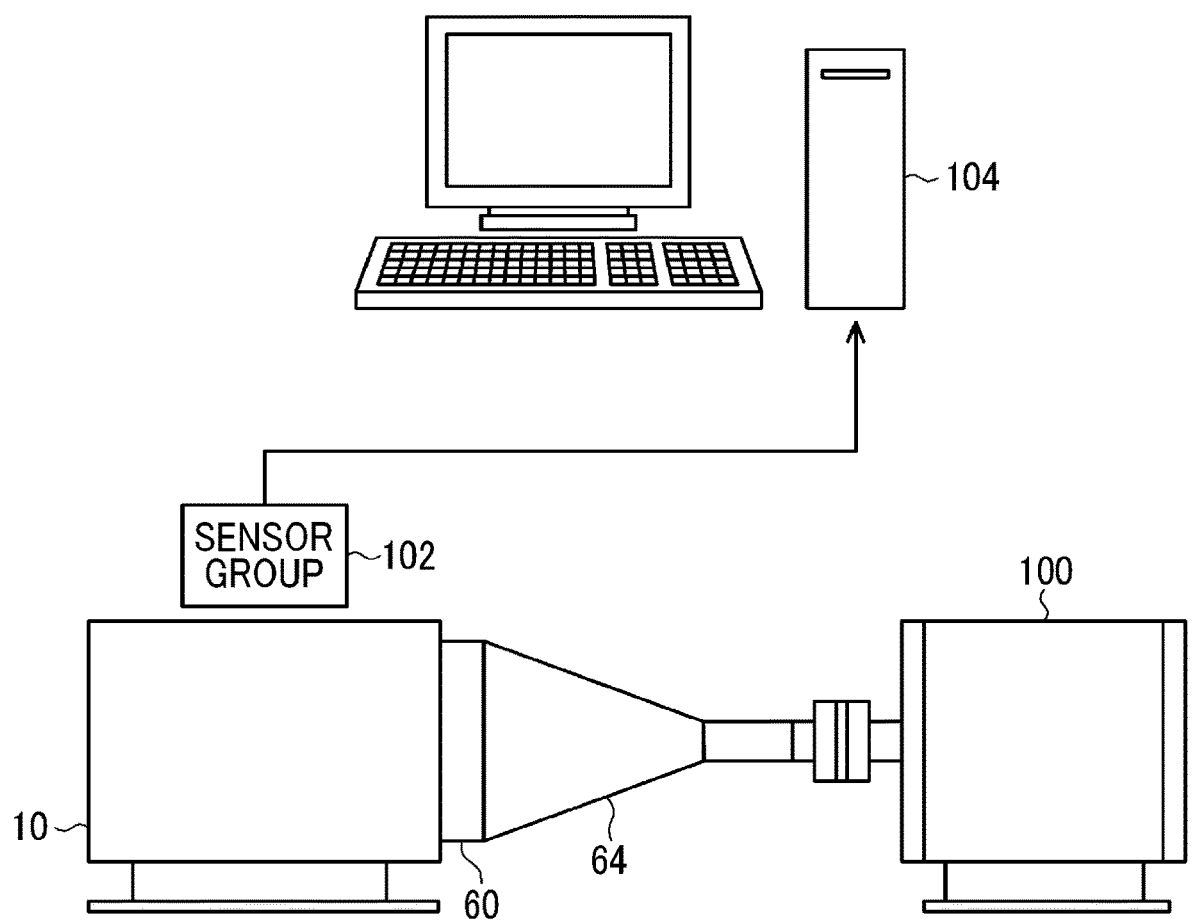
FIG. 4 is a diagram illustrating a system that generates mapping data according to the first embodiment.

When the process of S26 is completed, the CPU 72 temporarily ends the series of processes illustrated in FIG. 4. Incidentally, in the present embodiment, when an affirmative determination is made in the process of S10 and the process of S12 is performed, the process of S26 is temporarily stopped.

Next, a method of generating the mapping data 76a will be described. FIG. 4 illustrates a system that generates the mapping data 76a. As illustrated in FIG. 4, in the present embodiment, a dynamometer 100 is mechanically connected to the crankshaft 24 of the internal combustion engine 10 via the torque converter 60 and the transmission 64. Then, various state variables when the internal combustion engine 10 is operated are detected by a sensor group 102, and the detection results are input to an adaptation device 104 which is a computer that generates the mapping data 76a. The sensor group 102 includes the crank angle sensor 80, the air flow meter 82, and the air-fuel ratio sensor 83, which are sensors that detect a value for generating an input to the mapping.

FIG. 5 illustrates a procedure of a generation process of the mapping data. The process illustrated in FIG. 5 is executed by the adaptation device 104. The process illustrated in FIG. 5 may be realized by, for example, providing the adaptation device 104 with a CPU and a ROM, and executing a program stored in the ROM by the CPU.

In the series of processes illustrated in FIG. 5, the adaptation device 104 first acquires the same data as that acquired in the process of S12 as training data based on the detection result of the sensor group 102 (S30). This process is performed in a state where a plurality of the fuel injection valves 20 having the imbalance rate Riv of various values different from zero and three fuel injection valves having an imbalance rate of zero are prepared in advance by single measurement, and three fuel injection valves 20 having an imbalance rate of zero and one fuel injection valve 20 having an imbalance rate different from zero are mounted on the internal combustion engine 10. An imbalance rate Rivt of each of the mounted fuel injection valves is teacher data.

Next, the adaptation device 104 assigns training data other than the teacher data to the input variables x(1) to x(51) in the same manner as the process of S14 (S32). Then, the adaptation device 104 calculates the imbalance rates Riv(1) to Riv(4) using the input variables x(1) to x(51) obtained by the process of S32 in the same manner as the process of S16 (S34). Then, the CPU 72 determines whether or not the number of samples of the imbalance rate Riv(i) calculated by the process of S34 is equal to or more than a predetermined value (S36). Here, in order for the number of samples of the imbalance rate Riv(i) to be equal to or more than a predetermined value, it is requested that the imbalance rate Riv is calculated at various operating points defined by the rotation speed NE and the charging efficiency η by changing the operating state of the internal combustion engine 10 with each of the fuel injection valves having the imbalance rate Rivt different from zero mounted on each of the cylinders #1 to #4.

When determination is made that the number of samples of the imbalance rate Riv(i) is not equal to or more than a predetermined value (S36: NO), the adaptation device 104 returns to the process of S30. On the other hand, when determination is made that the number of samples of the imbalance rate Riv(i) is equal to or more than the predetermined value (S36: YES), the CPU 72 updates the input-side coefficient wFjk and the output-side coefficient wSij so as to minimize the square sum of differences between an imbalance rate Rivt as teacher data and each imbalance rate Riv(i) calculated by process of S34 (S38). Then, the adaptation device 104 stores the updated input-side coefficient wFjk and output-side coefficient wSij as learned mapping data (S40).

Here, the operation and effect of the present embodiment will be described.

(1) In the above embodiment, when the rotation speed NE of the crankshaft 24 becomes equal to or higher than the predetermined rotation speed NEth, the calculation of the imbalance rate Riv(i) based on the mapping data 76a is performed when the execution flag is in the ON state (S17: YES). Meanwhile, the calculation of the imbalance rate Riv(i) based on the mapping data 76a is not performed when the execution flag is in the OFF (S17: NO). That is, when the rotation speed NE becomes equal to or higher than the predetermined rotation speed NEth, a part of the determination process performed each time the crankshaft rotates by a specified angle is omitted. Therefore, the frequency at which the imbalance rate Riv(i) is calculated based on the mapping data 76a when the rotation speed NE is equal to or higher than the predetermined rotation speed NEth is lower than that when the rotation speed NE is lower than the predetermined rotation speed NEth. Therefore, even when the rotation speed NE increases, the processing frequency does not become excessively high, and it is possible to suppress the processing load on the CPU 72 from becoming excessively large.

(2) In the above embodiment, the rotation speed NE and the charging efficiency η as operating point variables defining the operating point of the internal combustion engine 10 are used as an input of the mapping. The operation amounts of the operation units of the internal combustion engine 10, such as the ignition device 22, the EGR valve 34, and the intake-side variable valve timing device 40, tend to be determined based on the operating point of the internal combustion engine 10. Therefore, the operating point variable is a variable including information regarding the operation amount of each operation unit. Therefore, by using the operating point variable as an input of the mapping, the imbalance rate Riv(i) can be calculated based on the information regarding the operation amount of each operation unit, and consequently, the imbalance rate Riv(i) can be calculated with higher accuracy.

(3) In the above embodiment, the input of the mapping includes the upstream average value Afuave. Thereby, compared with the case where the upstream detection value Afu for each time interval of time-series data is used, more accurate information about oxygen and unburned fuel flowing into the three-way catalyst 30 can be obtained without increasing the number of pieces of time-series data, and consequently, the imbalance rate Riv(i) can be calculated with higher accuracy.

Figure 6A:
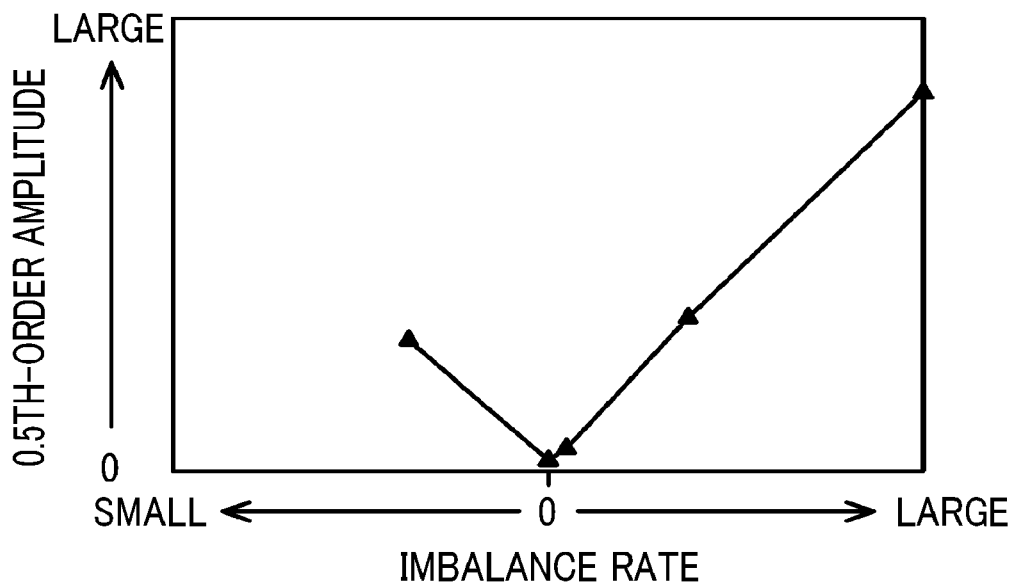
FIG. 6A is a diagram illustrating a relationship among an imbalance and a 0.5th-order amplitude.
Figure 6B:
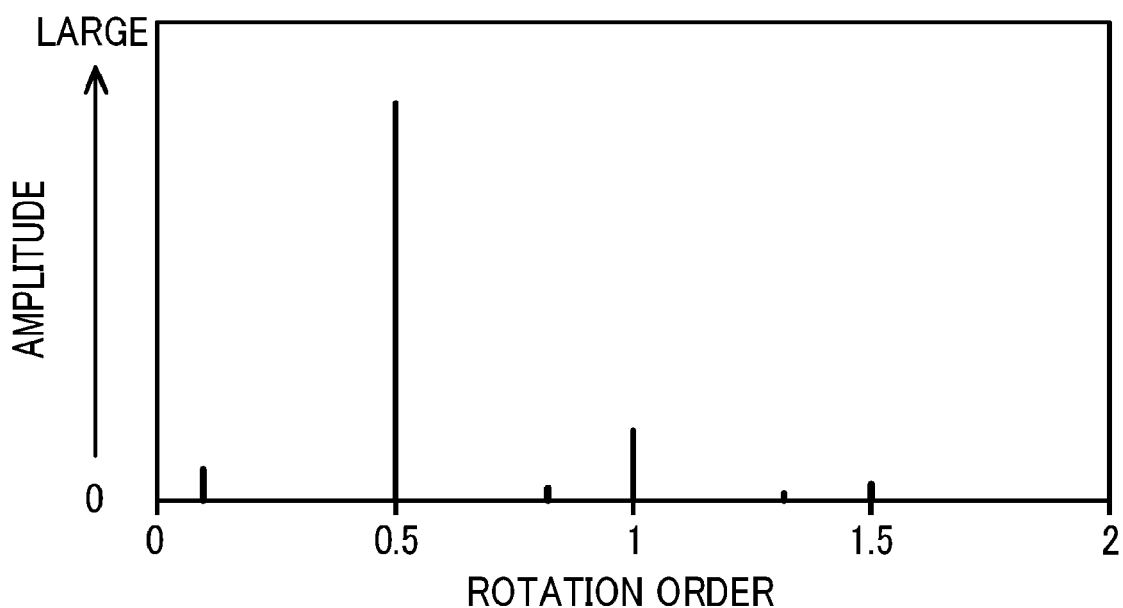
FIG. 6B is a diagram illustrating a relationship among an imbalance and a 0.5th-order amplitude.

(4) By including the 0.5th-order amplitude Ampf/2 in the input of the mapping, the imbalance rate Riv can be calculated with higher accuracy. That is, as illustrated in FIG. 6A, a linear relationship is established between the imbalance rate Riv and the 0.5th-order amplitude Ampf/2. As illustrated in FIG. 6B as an example where the imbalance rate Riv(1) is "1.15", the amplitude of the rotation frequency of the crankshaft 24 has a particularly large 0.5th-order component when there is a cylinder of which imbalance rate Riv is not zero. This is considered to be because the generated torque is shifted once in one combustion cycle when the imbalance rate Riv(i) is different from zero in any one of the cylinders #1 to #4. In the present embodiment, the imbalance rate Riv can be calculated with higher accuracy by capturing the torque fluctuation in the 720° CA cycle as the 0.5th-order amplitude Ampf/2.

Second Embodiment

Hereinafter, a second embodiment will be described with reference to the drawings, focusing on differences from the first embodiment.

Figure 7:
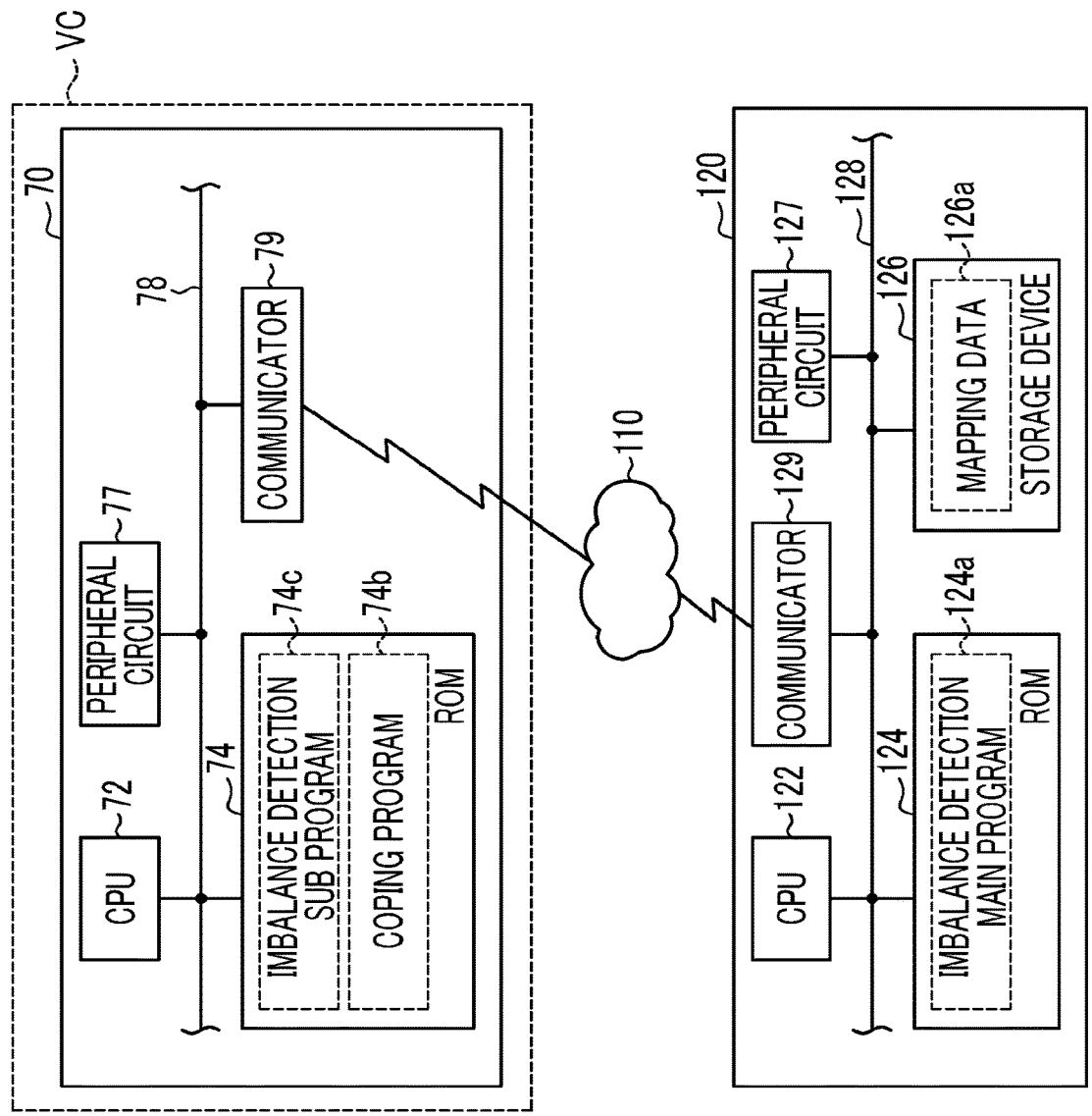
FIG. 7 is a diagram illustrating a configuration of a state determination system according to a second embodiment.

In the present embodiment, a process of calculating the imbalance rate Riv(i) is performed outside a vehicle. FIG. 7 illustrates an imbalance detection system according to the present embodiment. In FIG. 7, members corresponding to the members illustrated in FIG. 1 are denoted by the same reference numerals for convenience.

The control device 70 in the vehicle VC illustrated in FIG. 7 includes a communicator 79. The communicator 79 is a device for communicating with a center 120 via a network 110 outside the vehicle VC. The center 120 analyzes data transmitted from a plurality of the vehicles VC. The center 120 includes a CPU 122, a ROM 124, a storage device 126, a peripheral circuit 127, and a communicator 129, and the CPU 122, the ROM 124, the storage device 126, the peripheral circuit 127, and the communicator 129 can be communicated by a local network 128. The ROM 124 stores an imbalance detection main program 124a, and the storage device 126 stores mapping data 126a.

Figure 8:
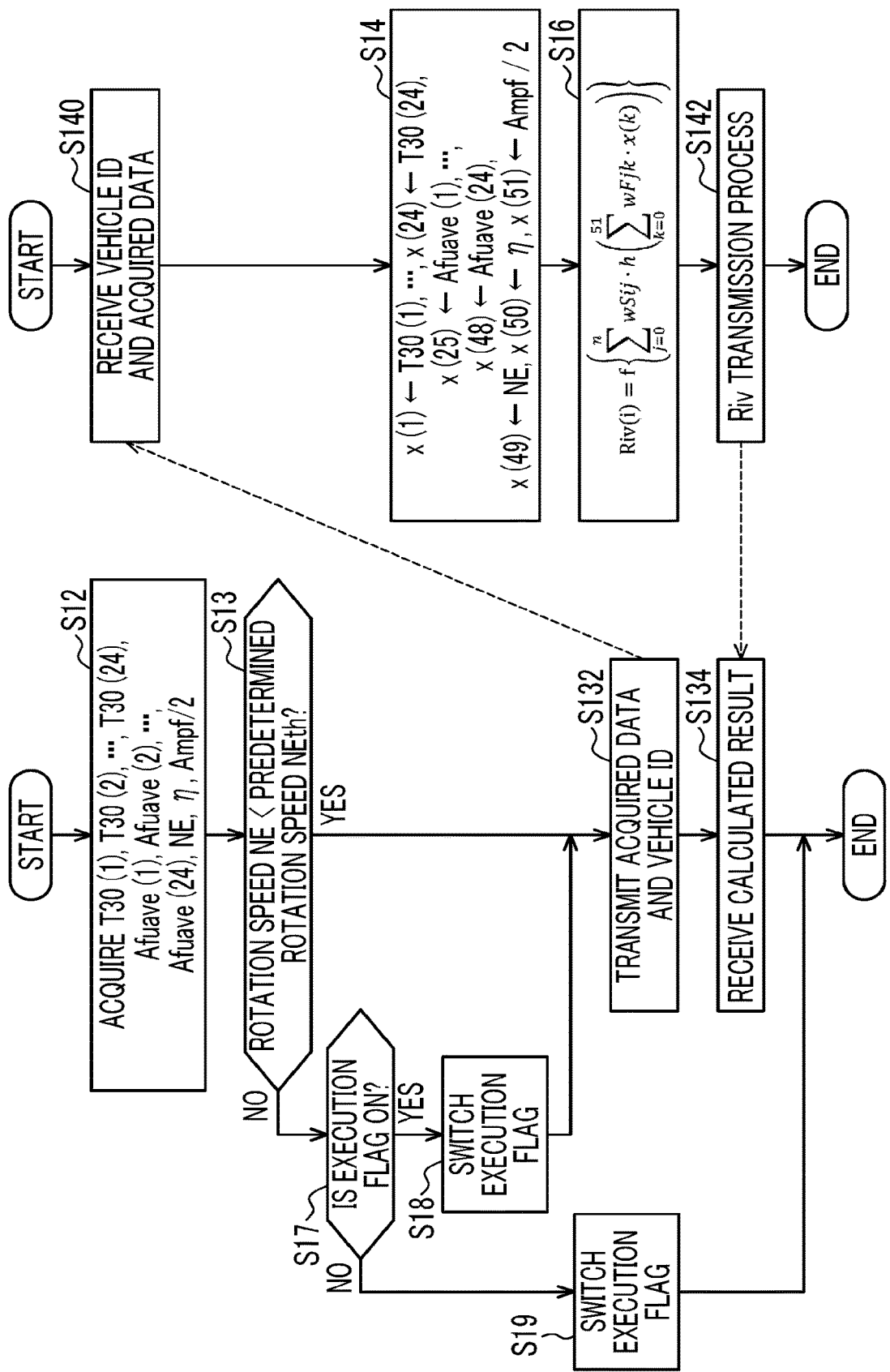
FIG. 8 is a flowchart illustrating a procedure of a determination process according to the second embodiment.

FIG. 8 illustrates procedures of processes executed by the system illustrated in FIG. 7. The process illustrated in FIG. 8 is realized by the CPU 72 executing an imbalance detection sub program 74c stored in the ROM 74 illustrated in FIG. 7. The process illustrated in FIG. 8 is realized by the CPU 122 executing the imbalance detection main program 124a stored in the ROM 124. In FIG. 8, the processes corresponding to the process illustrated in FIG. 2 are denoted by the same step numbers for convenience. Hereinafter, the processes illustrated in FIG. 8 will be described along the time series of an imbalance detection process.

As illustrated in FIG. 8, in the vehicle VC, when the CPU 72 completes the process of S12, the CPU 72 determines whether or not the rotation speed NE is lower than the predetermined rotation speed NEth (S13). Then, when the rotation speed NE is lower than the predetermined rotation speed NEth (S13: YES), the CPU 72 assigns the values acquired by the process of S12 to the input variables x(1) to x(51) of a mapping that outputs the imbalance rate Riv (S14). By operating the communicator 79, the data acquired in the process of S12a is transmitted to the center 120 together with a vehicle ID which is identification information on the vehicle VC (S132).

On the other hand, as illustrated in FIG. 8, the CPU 122 of the center 120 receives the transmitted data (S140), and executes the processes of S14 and S16. Then, by operating the communicator 129, the CPU 122 transmits a signal related to the imbalance rate Riv(i) to the vehicle VC to which the data received in the process of S140 has been transmitted (S142), and temporarily ends the series of processes illustrated in FIG. 8. On the other hand, as illustrated in FIG. 8, the CPU 72 receives a signal related to the imbalance rate Riv(i) (S134), and temporarily ends the series of processes illustrated in FIG. 8.

Here, when the rotation speed NE is equal to or higher than the predetermined rotation speed NEth (S13: NO), the CPU 72 determines whether or not the execution flag FE is ON (S17). When the execution flag FE is in an ON state (S17: YES), the CPU 72 then switches the execution flag FE from the ON state to an OFF state (S18). Next, the process of S132 described above is performed.

Meanwhile, when the execution flag FE is in the OFF state during the process of S17 (S17: NO), the CPU 72 switches the execution flag FE from the OFF state to the ON state (S19). Then, when the process of S19 is completed, the CPU 72 temporarily ends the series of processes illustrated in FIG. 8.

Here, the operation and effect of the present embodiment will be described. In the present embodiment, the following effects are obtained in addition to the effects (1) to (4) described above.

(5) In the above embodiment, by executing the imbalance determination process in the center 120, the calculation load of the control device 70 can be reduced.

Third Embodiment

Hereinafter, a third embodiment will be described with reference to the drawings, focusing on differences from the above-described first embodiment.

The state determination device for the internal combustion engine according to the above-described first embodiment is configured as a device that determines a state in which an inter-cylinder air-fuel ratio imbalance has occurred in the internal combustion engine 10 in which the variation in air-fuel ratio among the cylinders has occurred, based on the rotation fluctuation of the crankshaft 24. Even when a misfire has occurred in the internal combustion engine 10, the combustion state among the cylinders varies, and the rotation fluctuation of the crankshaft 24 increases. A state determination device for an internal combustion engine according to the present embodiment is configured as a device that determines a misfire occurring in such an internal combustion engine 10. The ROM 74 of the state determination device for the internal combustion engine according to the present embodiment stores a misfire detection program instead of the imbalance detection program 74a illustrated in FIG. 1.

Figure 9:
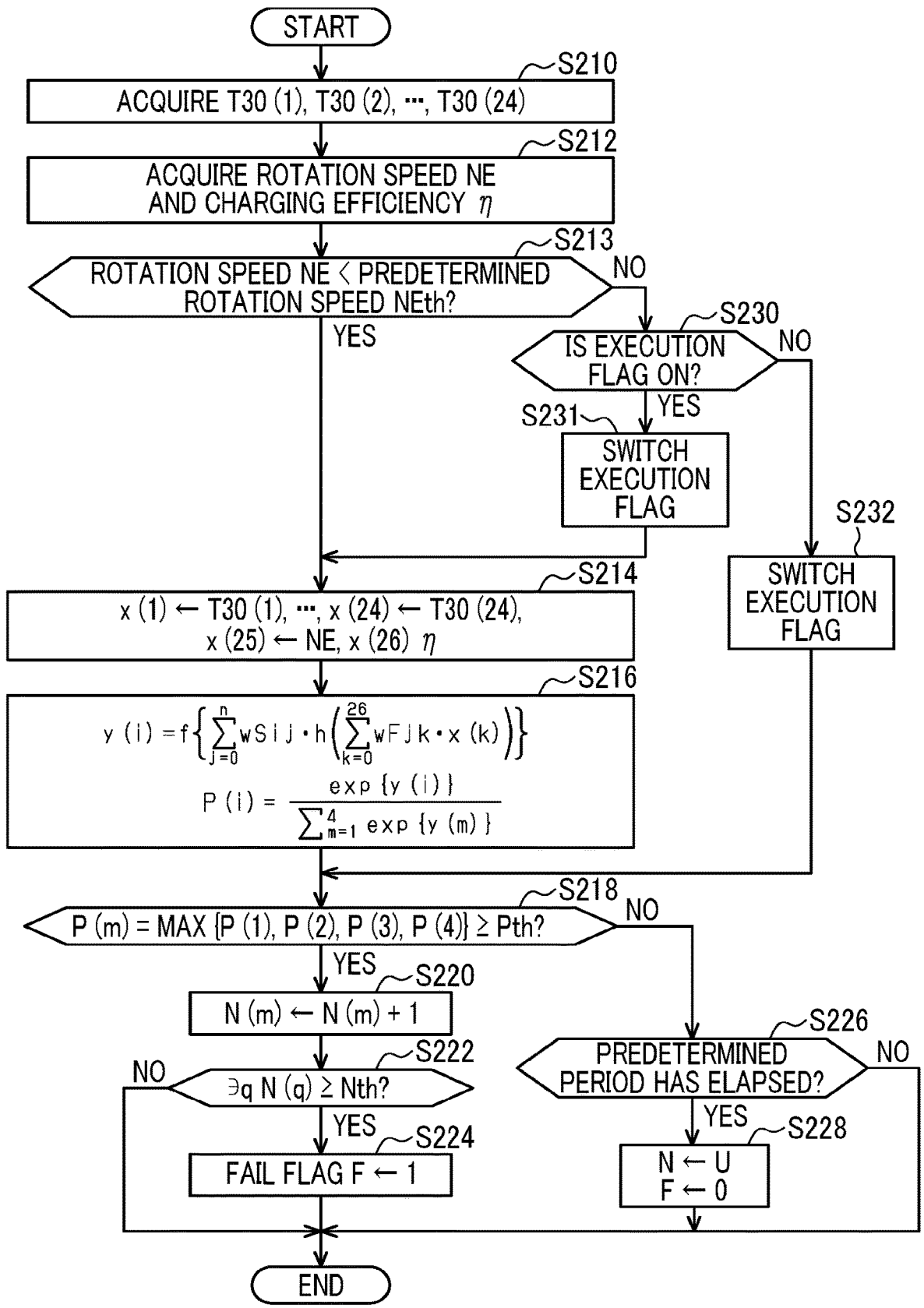
FIG. 9 is a flowchart illustrating a procedure of a misfire determination process according to a third embodiment.

In the series of processes illustrated in FIG. 9, the CPU 72 first acquires the minute rotation times T30(1), T30(2), . . . , T30(24) (S210). The minute rotation time T30 is calculated by the CPU 72 measuring the time needed for the crankshaft 24 to rotate by 30° CA based on the crank signal Scr of the crank angle sensor 80. Here, when the numbers in parentheses such as the minute rotation times T30(1), T30(2) are different, the number indicates that rotation angle intervals are different within 720° CA which is one combustion cycle. That is, the minute rotation times T30(1) to T30(24) indicate the rotation time at each angle interval obtained by equally dividing the rotation angle region of 720° CA by 30° CA.

Next, the CPU 72 acquires the rotation speed NE and the charging efficiency η (S212). The rotation speed NE is calculated by the CPU 72 based on the crank signal Scr of the crank angle sensor 80, and the charging efficiency η is calculated by the CPU 72 based on the rotation speed NE and the intake air amount Ga.

Next, the CPU 72 determines whether or not the rotation speed NE is lower than the predetermined rotation speed NEth (S213). Here, the predetermined rotation speed NEth is set such that the load of the calculation process based on the mapping data 76a (described later) is correspondingly large with respect to the processing capacity of the CPU 72. When the rotation speed NE is lower than the predetermined rotation speed NEth (S213: YES), the CPU 72 assigns the values acquired by the processes of S210 and S212 to the input variables x(1) to x(26) of a mapping for calculating a probability that a misfire has occurred (S214). Specifically, the CPU 72 sets "s=1 to 24" and assigns the minute rotation time T30(s) to the input variable x(s). That is, the input variables x(1) to x(24) are time-series data of the minute rotation time T30. The CPU 72 assigns the rotation speed NE to the input variable x(25) and assigns the charging efficiency η to the input variable x(26).

Next, the CPU 72 calculates a probability P(i) that a misfire has occurred in the cylinders #i (i=1 to 4) by inputting the input variables x(1) to x(26) to the mapping defined by the mapping data 76a stored in the storage device 76 illustrated in FIG. 1 (S216). The mapping data 76a is data defining a mapping capable of outputting the probability P(i) that a misfire has occurred in the cylinder #i in the period corresponding to the minute rotation times T30(1) to T30(24) acquired by the process of S210. Here, the probability P(i) is obtained by quantifying the degree of plausibility that a misfire has actually occurred based on the input variables x(1) to x(26). However, in the present embodiment, the maximum value of the probability P(i) that a misfire has occurred in the cylinder #i is smaller than "1", and the minimum value thereof is greater than "0". That is, in the present embodiment, the probability P(i) is obtained by quantifying the degree of plausibility that a misfire has actually occurred as a continuous value within a predetermined region greater than "0" and smaller than "1".

In the present embodiment, the mapping includes a neural network having a single intermediate layer and a softmax function for setting the sum of the probabilities P(1) to P(4) that a misfire has occurred to "1" by standardizing an output of the neural network. The neural network includes the input-side coefficient wFjk (j=0 to n, k=0 to 26) and the activation function h(x) as an input-side nonlinear mapping that nonlinearly transforms each output of an input-side linear mapping, which is a linear mapping defined by the input-side coefficient wFjk. In the present embodiment, the hyperbolic tangent "tan h(x)" is exemplified as the activation function h(x). The neural network includes the output-side coefficient wSij (i=1 to 4, j=0 to n) and the activation function f(x) as an output-side nonlinear mapping that nonlinearly transforms each output of an output-side linear mapping, which is a linear mapping defined by the output-side coefficient wSij. In the present embodiment, the hyperbolic tangent "tan h(x)" is exemplified as the activation function f(x). The value n indicates the dimension of the intermediate layer. In the present embodiment, the value n is smaller than the dimension (here, 26 dimensions) of the input variable x. An input-side coefficient wFj0 is a bias parameter, and becomes a coefficient of the input variable x(0) by defining the input variable x(0) as "1". An output-side coefficient wSi0 is a bias parameter, and multiplied by "1". This can be achieved, for example, by defining "wF00·x(0)+wF01·x(1)+ . . . " as being infinitely constant.

Specifically, the CPU 72 calculates a probability prototype y(i) which is an output of the neural network defined by the input-side coefficient wFjk, the output-side coefficient wSij, and the activation functions h(x), f(x). The probability prototype y(i) is a parameter having a positive correlation with a probability that a misfire has occurred in the cylinder #i. Then, the CPU 72 calculates the probability P(i) that a misfire has occurred in the cylinder #i based on the output of the softmax function having the probability prototypes y(1) to y(4) as inputs.

Next, the CPU 72 determines whether or not the maximum value P(m) of the probabilities P(1) to P(4) that a misfire has occurred is equal to or greater than a threshold Pth (S218). Here, a variable m takes one of values from 1 to 4, and the threshold Pth is set to a value equal to or greater than "½". Then, when determination is made that the maximum value P(m) is equal to or greater than the threshold Pth (S218: YES), the CPU 72 increments the number of times N(m) of a misfire of the cylinder #m having the highest probability (S220). Then, the CPU 72 determines whether or not there is a cylinder having a predetermined number of times Nth or more among the number of times N(1) to N(4) of a misfire (S222). Then, when determination is made that there is a cylinder having the predetermined number of times Nth or more (S222: YES), the CPU 72 assigns "1" to a fail flag F (S224) on the assumption that a misfire has occurred at a frequency exceeding an allowable range in a specific cylinder #q (q is one of 1 to 4). At this time, the CPU 72 stores information on the cylinder #q in which a misfire has occurred in the storage device 76 and holds the information until at least the misfire is eliminated in the cylinder #q.

On the other hand, when determination is made that the maximum value P(m) is smaller than the threshold Pth (S218: NO), the CPU 72 determines whether or not a predetermined period has elapsed since the process of S224 or a process of S228 (to be described later) is performed (S226). Here, the predetermined period is longer than the period of one combustion cycle, and desirably has a length of 10 times or more of one combustion cycle.

When determination is made that the predetermined period has elapsed (S226: YES), the CPU 72 initializes the number of times N(1) to N(4) of a misfire and initializes the fail flag F (S228). When the processes of S224 and S228 are completed, or when a negative determination is made in the processes of S222 and S226, the CPU 72 temporarily ends the series of processes illustrated in FIG. 9.

By the way, when the rotation speed NE is equal to or higher than the predetermined rotation speed NEth (S213: NO), the CPU 72 determines whether or not the execution flag FE is ON (S230). When the execution flag FE is in an ON state (S230: YES), the CPU 72 then switches the execution flag FE from the ON state to an OFF state (S231). Next, the process of S214 described above is performed.

Meanwhile, when the execution flag FE is in the OFF state during the process of S230 (S230: NO), the CPU 72 switches the execution flag FE from the OFF state to the ON state (S232). Then, when the process of S232 is completed, the CPU 72 executes the process of S218 described above. That is, when the process of S232 is completed, the processes of S214 and S216 are not performed.

Figure 10:
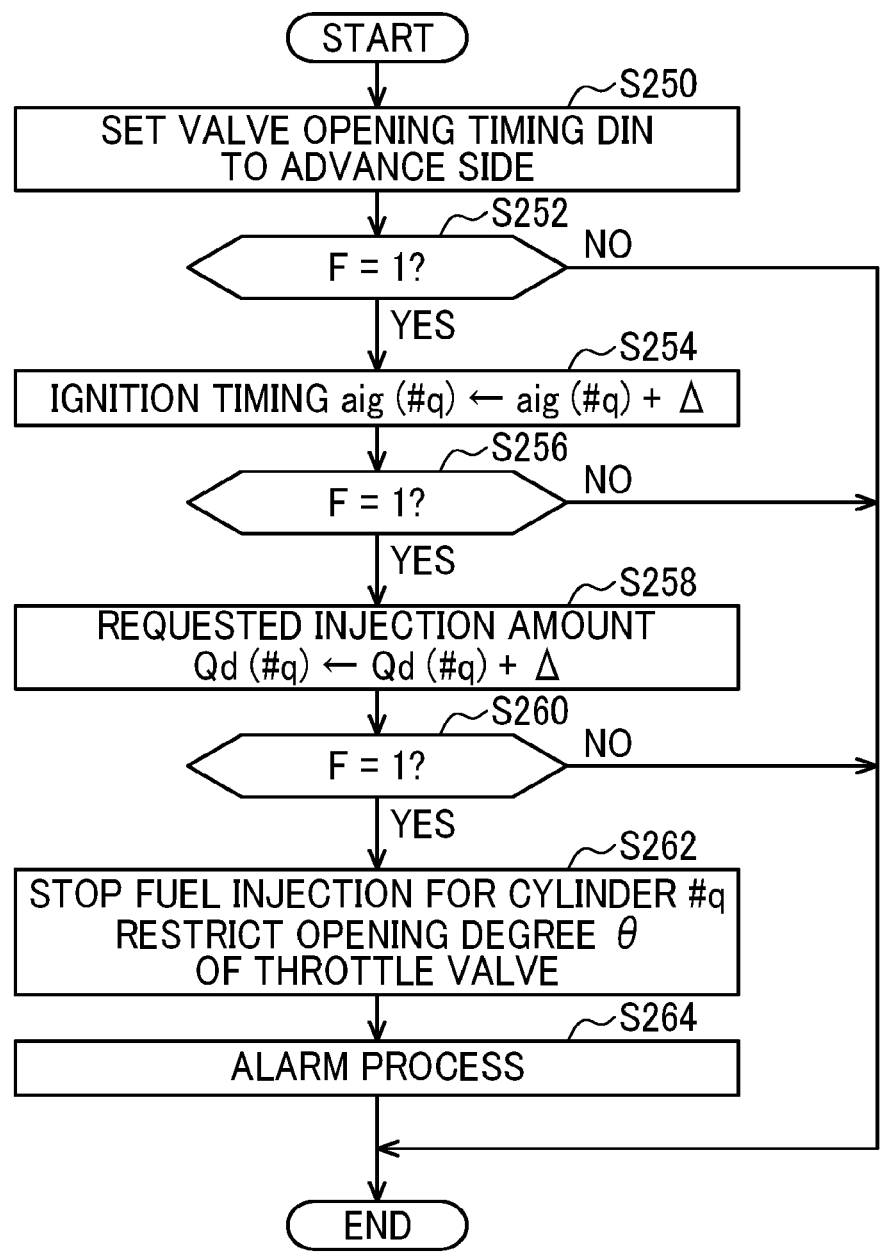
FIG. 10 is a flowchart illustrating a procedure of a coping process according to the third embodiment.

FIG. 10 illustrates a procedure of a process of coping with a misfire when the misfire has occurred. The process illustrated in FIG. 10 is realized by the CPU 72 executing the coping program 74b stored in the ROM 74 illustrated in FIG. 1 with the switching of the fail flag F from "0" to "1" as a trigger.

In the series of processes illustrated in FIG. 10, the CPU 72 first outputs the operation signal MS5 to the intake-side variable valve timing device 40 to operate the intake-side variable valve timing device 40 in order to set a valve opening timing DIN of the intake valve 16 to an advance side (S250). Specifically, for example, the CPU variably sets the valve opening timing DIN in accordance with the operating point of the internal combustion engine 10 at the normal time when the fail flag F is "0", and in the process of S250, the CPU advances the actual valve opening timing DIN with respect to the valve opening timing DIN at the normal time. The process of S250 is for stabilizing the combustion by increasing the compression ratio.

Next, after the process of S250 is continued for the predetermined period or more, the CPU 72 determines whether or not the fail flag F is "1" (S252). This process is for determining whether or not the situation in which a misfire occurs has been eliminated by the process of S250. When determination is made that the fail flag F is "1" (S252: YES), the CPU 72 outputs the operation signal MS3 to the ignition device 22 to operate the ignition device 22 for the cylinder #q in which a misfire has occurred, and advances an ignition timing aig by a predetermined amount Δ (S254). This process is for eliminating the situation in which a misfire occurs.

Next, after the process of S254 is continued for the predetermined period or more, the CPU 72 determines whether or not the fail flag F is "1" (S256). This process is for determining whether or not the situation in which a misfire occurs has been eliminated by the process of S254. When determination is made that the fail flag F is "1" (S256: YES), the CPU 72 outputs the operation signal MS2 to the fuel injection valve 20 to operate the fuel injection valve 20 for the cylinder #q in which a misfire has occurred, and increases the requested injection amount Qd, which is the amount of fuel requested in one combustion cycle by the fuel injection valve 20, by a predetermined amount (S258). This process is for eliminating the situation in which a misfire occurs.

Next, after the process of S258 is continued for the predetermined period or more, the CPU 72 determines whether or not the fail flag F is "1" (S260). This process is for determining whether or not the situation in which a misfire occurs has been eliminated by the process of S258. When determination is made that the fail flag F is "1" (S260: YES), the CPU 72 stops fuel injection for the cylinder #q in which a misfire has occurred, and adjusts the operation signal MS1 output to the throttle valve 14 in order to operate the throttle valve 14 while restricting an opening degree 0 of the throttle valve 14 to a smaller side (S262). Then, the CPU 72 executes a process of alarming that a misfire has occurred by operating the warning light 90 illustrated in FIG. 1 functioning as an alarm unit (S264).

When a negative determination is made in the processes of S252, S256, and S260, that is, when the situation in which a misfire occurs is eliminated or when the process of S264 is completed, the CPU 72 temporarily ends the series of processes illustrated in FIG. 10. When an affirmative determination is made in the process of S262, the process of S264 is continued as a fail-safe process.

Incidentally, the mapping data 76a in the present embodiment is generated as follows, for example. First, the internal combustion engine 10 to which the torque converter 60 is connected is installed on a test bench with a dynamometer connected to the output shaft of the torque converter 60. Then, the internal combustion engine 10 is operated on the test bench, and the fuel injection is stopped at a timing randomly selected from the timings at which the requested fuel should be injected in each of the cylinders #1 to #4. Then, in the cylinder in which fuel injection is stopped, data in which the value of a combustion state variable PR is set to "1" is included in the teacher data, and in the cylinder in which fuel injection is not stopped, data in which the value of the combustion state variable PR is set to "0" is included in the teacher data.

Then, the value of the combustion state variable PR is calculated by the same processes as the processes of S212 and S214, using the value of a rotation waveform variable at each time and the value of the variable acquired by the process of S210. The values of the input-side coefficient wFjk and the output-side coefficient wSij are learned so as to reduce the difference between the value of the combustion state variable PR thus calculated and the teacher data. Specifically, for example, the values of the input-side coefficient wFjk and the output-side coefficient wSij may be learned so as to minimize the tolerance entropy. An input shaft rotation speed NT can be simulated by the rotation speed of the dynamometer.

Here, the operation and effect of the present embodiment will be described.

(6) In the above embodiment, when the rotation speed NE of the crankshaft 24 becomes equal to or higher than a predetermined threshold, the calculation of the probability P(i) that a misfire has occurred in the cylinder #i (i=1 to 4) based on the mapping data 76a is performed when the execution flag is in the ON state (S17: YES). Meanwhile, the calculation of the probability P(i) that a misfire has occurred in the cylinder #i (i=1 to 4) based on the mapping data 76a is not performed when the execution flag is in the OFF state (S17: NO). That is, the frequency at which the probability P(i) that a misfire has occurred in the cylinder #i (i=1 to 4) is calculated based on the mapping data 76a when the rotation speed NE is equal to or higher than the predetermined rotation speed NEth is lower than that when the rotation speed NE is lower than the predetermined rotation speed NEth. Therefore, even when the rotation speed NE increases, the processing frequency does not become excessively high, and it is possible to suppress the processing load on the CPU 72 from becoming excessively large.

Correspondence

The correspondence between the matters in the above embodiments and the matters described in the "SUMMARY" section is as follows. A state determination device corresponds to the control device 70. An execution device corresponds to the CPU 72 and the ROM 74 in the first and third embodiments, and corresponds to the CPUs 72, 122 and the ROMs 74, 124 in the second embodiment. A storage device corresponds to the storage device 76 in the first and third embodiments, and corresponds to the storage device 126 in the second embodiment. An acquisition process corresponds to the process of S12 in the first and second embodiments and the process of S210 in the third embodiment. An internal combustion engine state variable corresponds to the minute rotation times T30(1), T30(2), ..., T30(24) and the upstream average values Afuave(1), Afuave(2), ..., Afuave(24) in the first and second embodiments, and corresponds to the minute rotation times T30(1), T30(2), ..., T30(24) in the third embodiment. A determination process corresponds to the processes of S13 to S16 in FIG. 2 and the processes of S213 to S216 in FIG. 9. A specified angle corresponds to 720° CA. A threshold corresponds to the predetermined rotation speed NEth. An instantaneous speed variable corresponds to the minute rotation time T30, and a plurality of rotation waveform variables correspond to the minute rotation times T30(1), T30(2), ..., T30(24). An air-fuel ratio detection variable corresponds to the upstream average values Afuave(1), Afuave(2), ..., Afuave (24). An imbalance variable corresponds to the imbalance rate Riv. A first interval corresponds to 30° CA, and a second interval corresponds to 30° CA. A coping process corresponds to the processes in FIG. 3. Predetermined hardware corresponds to the warning light 90 and the fuel injection valve 20. A third interval corresponds to 720° CA, a fourth interval corresponds to 30° CA, and an instantaneous speed parameter corresponds to minute rotation time T30. A determination process corresponds to the processes of S214 to S216. A coping process corresponds to the processes in FIG. 10. Predetermined hardware corresponds to the intake-side variable valve timing device 40, the ignition device 22, the fuel injection valve 20, and the throttle valve 14. A first execution device corresponds to the CPU 72 and the ROM 74. A second execution device corresponds to the CPU 122 and the ROM 124. A vehicle transmission process corresponds to the process of S132 in FIG. 8. An external reception process corresponds to the process of S140 in FIG. 8. A "signal based on an output calculated by an output calculation process" corresponds to the signal related to the determination result. A data analysis device corresponds to the center 120. A control device for the internal combustion engine corresponds to the control device 70 illustrated in FIG. 7.

Other Embodiments

The present embodiment can be modified and implemented as follows. The present embodiment and the following modification examples can be implemented in combination with each other within a technically consistent range.

Regarding Internal Combustion Engine State Variable

In the above embodiments, the internal combustion engine state variables input to the mapping are not limited to the examples of the above embodiments. As the rotation waveform variable in the first and second embodiments, the minute rotation time T30 at each of a plurality of intervals obtained by dividing the rotation angle interval of 720° CA which is one combustion cycle is used as the input of the mapping, but the embodiments not limited thereto. For example, among 0° CA to 720° CA, each of 0° CA to 20° CA, 40° CA to 60° CA, 80° CA to 100° CA, 120° CA to 140° CA, 160° CA to 180° CA, . . . , 700° CA to 720° CA may be set as the second interval, and the time requested for their rotation may be used as the input of the mapping. The instantaneous speed parameter in the third embodiment is not limited to the minute rotation time which is the time requested for the rotation at the fourth interval. For example, the instantaneous speed parameter may be a value obtained by dividing the fourth interval by the minute rotation time. It is not indispensable that the instantaneous speed parameter has been subjected to a normalization process in which the difference between the maximum value and the minimum value is a fixed value. The filtering process used as a pre-process for inputting a mapping is not limited to the above-described process. For example, the filtering process may be performed based on the minute rotation time of the input shaft 66 of the transmission 64 to remove the influence of the rotation of the crankshaft 24 by the input shaft 66. However, it is not indispensable that the instantaneous speed parameter used as the input of the mapping has been subjected to the filtering process. The internal combustion engine state variable is not particularly limited as long as it is a parameter indicating the state of the internal combustion engine.

Regarding Omission of Part of Determination Process

In the above embodiment, while the acquisition process is performed at every 720° CA, when the rotation speed NE is the predetermined rotation speed NEth, the determination process is not performed for each acquisition process, thereby omitting a part of the determination process. However, the omission of a part of the determination process is not limited to the example of the above embodiment. For example, when a second specified angle different from the specified angle is set in the first embodiment, and the rotation speed NE is equal to or higher than the predetermined rotation speed NEth, the CPU 72 executes the acquisition process for each second specified angle. At this time, the second specified angle may be set larger than the specified angle, for example, 1440° CA. In this case, the CPU 72 first compares the rotation speed NE with the predetermined rotation speed NEth before S12. Then, when the rotation speed NE is lower than the predetermined rotation speed NEth, the CPU 72 executes the acquisition process of S12 each time 720° CA rotation is performed, and executes the determination process of S14 and S16 each time the acquisition process is performed. Meanwhile, when the rotation speed NE is equal to or higher than the predetermined rotation speed NEth, the CPU 72 executes the processes of S12 to S16, where the acquisition process of S12 is performed at every 1440° CA of the second specified angle. In this case, when the rotation speed NE is lower than the predetermined rotation speed NEth, the CPU 72 executes the determination process at every 720° CA, while when the rotation speed NE is equal to or higher than the predetermined rotation speed NEth, the CPU 72 executes the determination process at every 1440° CA. When the rotation speed NE is equal to or higher than the predetermined rotation speed NEth, one out of every two determination processes at the 720° CA rotation when the rotation speed NE is lower than the predetermined rotation speed NEth is omitted. As a result, the frequency of the determination process is lower when the rotation speed NE is equal to or higher than the predetermined rotation speed NEth than when the rotation speed NE is lower than the predetermined rotation speed NEth. Therefore, the frequency of performing the acquisition process of the determination process is reduced, so that the frequency of the determination process can also be reduced.

Regarding Frequency of Omitting Determination Process

In the above embodiment, the execution flag is switched each time the acquisition process is performed. Therefore, the CPU 72 omits the determination process once in two processes, that is, in two combustion cycles, but the frequency of omitting the determination process is not limited to the example of the above embodiment. For example, the determination process may be omitted once in three combustion cycles, or may be omitted three times in four combustion cycles. The frequency of the determination process may be changed according to the rotation speed NE of the crankshaft 24. Specifically, the number of times that the determination process is omitted is counted by a counter before the process of S18 or S19, and when the count reaches a predetermined number, the determination process of S18 or S19 may be performed.

Regarding First Interval and Second Interval

In the first and second embodiments, the first interval that is the sampling interval of the upstream average value Afuave used as the input of the mapping is not limited to 30° CA. For example, the angle interval may be less than 30° CA, such as 10° CA. However, the angle interval is not limited to 30° CA or less, but may be 45° CA or the like, for example.

The second interval that is a sampling interval of the minute rotation time T30 used as an input of the mapping is not limited to 30° CA. For example, the angle interval may be less than 30° CA, such as 10° CA. However, the angle interval is not limited to 30° CA or less, but may be 45° CA or the like, for example. It is not indispensable that the first interval and the second interval have the same size.

Regarding Third Interval and Fourth Interval

In the third embodiment, the minute rotation time T30 as an instantaneous speed parameter at each of a plurality of continuous second intervals within a rotation angle interval of 720° CA, which is one combustion cycle, is used as an input parameter of a mapping for determining the presence or absence of a misfire. That is, the example in which the third interval is 720° CA and the fourth interval is 30° CA has been described, but the embodiment is not limited thereto. For example, the third interval may be a rotation angle interval longer than 720° CA. However, it is also not indispensable that the third interval is 720° CA or more. For example, an input of a mapping or the like that outputs data related to the probability that a misfire has occurred or a generated torque in a specific cylinder may be an interval of 720° CA or less, such as setting the third interval to 480° CA. At this time, it is desirable to set the rotation angle interval longer than the appearance interval of the compression top dead center. The above third interval includes the compression top dead center of the cylinder for which the probability that a misfire has occurred is to be obtained.

The fourth interval is not limited to 30° CA. For example, the angle interval may be less than 30° CA, such as 10° CA.

However, the angle interval is not limited to 30° CA or less, but may be 45° CA or the like, for example.

Regarding Parameter Defining Operating Point of Internal Combustion Engine

In the third embodiment, the operating point is defined by the rotation speed NE and the charging efficiency η, but the embodiment is not limited thereto. For example, the rotation speed NE and the intake air amount Ga may be used. For example, instead of the charging efficiency η, the injection amount or the requested torque for the internal combustion engine may be used as the load. The use of the injection amount and the requested torque as the load is particularly effective in a compression ignition type internal combustion engine described in the "Regarding Internal Combustion Engine" section below.

Regarding Input of Mapping

In the third embodiment, the input of the mapping to be input in addition to the instantaneous speed parameter is not limited to the example of the above embodiment. For example, a parameter for adjusting the combustion speed of the air-fuel mixture in the combustion chamber 18 of the internal combustion engine 10 or a state variable of a road surface on which the vehicle VC on which the internal combustion engine 10 is mounted travels may be included. It is not indispensable that the operating point of the internal combustion engine 10 is included in the input of the mapping. For example, as described in the "Regarding Internal Combustion Engine" section below, in the case where the internal combustion engine is mounted on a series hybrid vehicle and control in which the operating point of the internal combustion engine is limited to a narrow range is assumed, the operating point may not be included. Any one of the two parameters of the rotation speed NE and the load or the rotation speed NE and the intake air amount defining the operating point may be used as the input of the mapping to be input in addition to the instantaneous speed parameter.

Similarly, in the first and second embodiments, the input of the mapping to be input in addition to the rotation waveform variable and a plurality of the air-fuel ratio detection variables is not limited to the example of the above embodiment. It is not indispensable that the operating point of the internal combustion engine 10 is included in the input of the mapping.

For example, for some of a plurality of types of physical quantities used as the input of the mapping for detecting in the above embodiment, instead of being directly input to a neural network or a regression equation, some principal components obtained by the principal component analysis thereof may be directly input to the neural network or the regression equation. However, when the principal component is used as the input of the neural network or the regression equation, it is not indispensable that merely a part of the input to the neural network or the regression equation is the principal component, and the entire input may be the principal component. When the principal component is used as the input of the mapping for detecting, the mapping data 76a, 126a include data defining the mapping for detecting that determines the principal component.

Regarding State Determination System for Internal Combustion Engine

In the third embodiment, when the process related to the detection of a misfire is performed, a state determination system for an internal combustion engine may be configured as in the second embodiment. In this case, the center 120 may determine a misfire and transmit a determination result to the vehicle VC.

Regarding Coping Process

The configuration of the coping process in the above embodiments is not limited to the examples of the above embodiments. For example, by operating the warning light 90, the fact that a misfire has occurred is alarmed through visual information, but the coping process is not limited thereto. For example, by operating a speaker, the fact that a misfire has occurred may be alarmed through auditory information. For example, the control device 70 illustrated in FIG. 1 may include the communicator 129, and may operate the communicator 129 to transmit a signal indicating that a misfire has occurred to a portable terminal of a user. This can be realized by installing an application program for performing the alarm process in the portable terminal of the user. As the coping process in the first embodiment, a part or all of the processes illustrated in FIG. 3 may be omitted. In this regard, the same applies to the processes in FIG. 10 in the third embodiment.

Regarding Mapping Data

In the above embodiments, the activation functions h, h1, h2, . . . , hα are hyperbolic tangents, and the output activation function is a softmax function. However, the embodiments are not limited thereto. For example, the activation functions h, h1, h2, . . . , hα may be Rectified Linear Unit (ReLU). For example, the output activation function may be a logistic sigmoid function. In this case, for example, the number of nodes in the output layer may be one, and the output variable may be the combustion state variable PR. In that case, when the value of the output variable is equal to or greater than a predetermined value, determination is made that there is an abnormality, so that the presence or absence of an abnormality can be determined.

Regarding Algorithms of Machine Learning

Algorithms of machine learning are not limited to those using neural networks. For example, a regression equation may be used. This corresponds to the above neural network having no intermediate layer.

Regarding Method of Generating Mapping Data

In the third embodiment, the learning is performed in a situation where a misfire occurs randomly, but the embodiment is not limited thereto. For example, the learning may be performed in a situation where misfire occurs continuously in a specific cylinder. However, in that case, it is desirable that an inter-cylinder variable used as the input of the mapping or an inter-cylinder variable used for a fluctuation pattern variable is a difference between the minute rotation times T30 corresponding to the respective compression top dead centers of the cylinder of which misfire is to be detected and the other cylinders.

In the above embodiment, the method of generating the mapping data is not limited to the method of performing the learning based on the rotation behavior of the crankshaft 24 when the dynamometer of the crankshaft 24 is connected and the internal combustion engine 10 is operated. For example, the learning may be performed based on the rotation behavior of the crankshaft 24 when the internal combustion engine 10 is mounted on a vehicle and the vehicle travels. According to this, the influence of the rotation behavior of the crankshaft 24 due to the state of the road surface on which the vehicle travels can be reflected in the learning.

Regarding Data Analysis Device

In the second embodiment, the processes in FIG. 8 may be performed by, for example, a portable terminal carried by a user. This can be realized by installing an application program for performing the processes in FIG. 7 in the portable terminal. At this time, the transmission and reception process of the vehicle ID may be deleted, for example, by setting the distance in which the data transmission is effective in the process of S132 to about the length of the vehicle.

Regarding Execution Device

The execution device in each of the embodiments is not limited to a device that includes the CPUs 72, 122 and the ROMs 74, 124 and that executes software processing. For example, a dedicated hardware circuit (for example, an ASIC) that performs hardware processing on at least a part of the software-processed data in the above embodiments may be provided. That is, the execution device may have any one of the following configurations (a) to (c). (a) A processor that executes all of the above processing in accordance with a program, and a program storage device such as a ROM that stores the program are provided. (b) A processor and a program storage device that execute a part of the above processing in accordance with a program, and a dedicated hardware circuit that executes the remaining processing are provided. (c) A dedicated hardware circuit that executes all of the above processing is provided. Here, there may be a plurality of software execution devices provided with the processor and the program storage device, and a plurality of dedicated hardware circuits.

Regarding Storage Device

In the first and second embodiments, the storage devices that store mapping data 76a, 126a and the ROMs 74, 124 which are storage devices that store the imbalance detection program 74a and the imbalance detection main program 124a are used as separate storage devices. However, the embodiments are not limited thereto. In this regard, the same applies to the storage device that stores the mapping data 76a and the misfire detection program in the third embodiment.

Regarding Computer

The computer is not limited to a computer including an execution device such as the CPU 72 and the ROM 74 mounted on a vehicle and an execution device such as the CPU 122 and the ROM 124 provided in the center 120. For example, the computer may include an execution device mounted on a vehicle, an execution device provided in the center 120, and an execution device such as a CPU and a ROM in a portable terminal of a user. This can be realized, for example, by using the process of S132 in FIG. 8 as a process of transmitting data to the portable terminal of the user and performing the processes of S140, S14 to S16, and S142 on the portable terminal.

Regarding State of Internal Combustion Engine

When the acquisition process is performed each time the crankshaft 24 rotates by the specified angle, the state of the internal combustion engine 10 determined by the determination process may be a state other than a misfire or an inter-cylinder air-fuel ratio imbalance. For example, even when a so called compression loss, in which the intake valve or the exhaust valve is opened and fixed to cause insufficient compression of the intake air in the cylinder, occurs in a specific cylinder, a variation occurs in the combustion state among the cylinders, and thus the rotation fluctuation of the crankshaft 24 increases. Therefore, when such a detection of the compression loss is performed using a mapping in which the above-described internal combustion engine state variables are used as inputs, the compression loss can be determined in a manner that reflects the influence on the rotation behavior of the crankshaft 24.

Regarding Combination of Embodiments

Both the imbalance detection program 74a in the first and second embodiments and the misfire detection program in the third embodiment may be installed, and the CPU 72 may determine any state of a misfire and an inter-cylinder air-fuel ratio imbalance. In this case, since the calculation load of the CPU 72 is larger than that in determining either the state of the misfire or the state of the inter-cylinder air-fuel ratio imbalance, when the rotation speed NE of the crankshaft 24 is correspondingly high, the effects of applying the above embodiments are great.

By combining the first and second embodiments, the vehicle VC may determine the imbalance detection program, while the center 120 may determine the imbalance detection program. By combining the second and third embodiments, the center 120 may determine the state of the inter-cylinder air-fuel ratio imbalance, while the vehicle VC may determine the state of the misfire.

Regarding Center

In the second embodiment, the center 120 may not transmit the imbalance rate Riv to the vehicle VC. In this case, the imbalance rate Riv can be stored in the center 120 and used for research and development.

Regarding Internal Combustion Engine

In the above embodiments, the in-cylinder injection valve that injects fuel into the combustion chamber 18 is exemplified as the fuel injection valve, but the embodiments are not limited thereto. For example, a port injection valve that injects fuel into the intake passage 12 may be used. For example, both a port injection valve and an in-cylinder injection valve may be provided. The internal combustion engine is not limited to a spark ignition type internal combustion engine, and may be, for example, a compression ignition type internal combustion engine using light oil or the like as fuel.

Regarding Vehicle

Although the vehicle VC of the above embodiments has a configuration in which the lock-up clutch 62, the torque converter 60, and the transmission 64 are provided in the drive system, the vehicle may have a different drive system configuration.

What is claimed is:

1. A state determination device for an internal combustion engine, the state determination device comprising:
   a storage device; and
   an execution device, wherein:
   the storage device is configured to store mapping data that is data defining a mapping that outputs a determination result of a state of the internal combustion engine by using an internal combustion engine state variable that is a parameter indicating the state of the internal combustion engine as an input;
   the execution device is configured to execute an acquisition process of acquiring the internal combustion engine state variable each time a crankshaft of the internal combustion engine rotates by a specified angle and a determination process of determining the state of the internal combustion engine based on an output of the mapping using the internal combustion engine state variable as an input;
   the mapping data is data that has been learned by machine learning; and
   the execution device is configured to, when a rotation speed of the crankshaft becomes equal to or higher than a predetermined threshold, omit a part of the determination process performed repeatedly each time the crankshaft rotates by the specified angle and execute the determination process other than the part of the determination process.

2. The state determination device according to claim 1, wherein:
the internal combustion engine includes a plurality of cylinders, an air-fuel ratio sensor that detects an air-fuel ratio on a downstream side of a combustion chamber, and a sensor that detects a rotation behavior of the crankshaft;
the state of the internal combustion engine is a variation in air-fuel ratio among the cylinders;
the execution device is configured to execute a coping process for coping with the variation in air-fuel ratio by operating predetermined hardware when determination is made that the air-fuel ratio among the cylinders has varied by the determination process;
the mapping data is data defining a mapping that outputs an imbalance variable that is a variable indicating a degree of variation among actual air-fuel ratios when a fuel injection valve is operated to control air-fuel ratios of air-fuel mixtures in the respective cylinders to be equal to each other by using, as an input, a rotation waveform variable and an air-fuel ratio detection variable that is a variable corresponding to an output of the air-fuel ratio sensor at each of a plurality of first intervals;
the execution device is configured to acquire the rotation waveform variable and the air-fuel ratio detection variable at each of the first intervals based on a detection value of the sensor that detects a rotation behavior of the crankshaft, in the acquisition process;
the rotation waveform variable is a variable indicating a difference between instantaneous speed variables that are variables corresponding to the rotation speed of the crankshaft at each of a plurality of second intervals;
both the first interval and the second interval are angle intervals of the crankshaft smaller than an appearance interval of a compression top dead center; and
the rotation waveform variable and a plurality of the air-fuel ratio detection variables that are used as an input of the mapping are time-series data within a predetermined angle interval larger than the appearance interval.

3. The state determination device according to claim 1, wherein:
the state of the internal combustion engine is a presence or absence of a misfire of the internal combustion engine;
the execution device is configured to execute a coping process for coping with occurrence of a misfire by operating predetermined hardware when determination is made that the misfire has occurred by the determination process;
the mapping data is data defining a mapping that outputs a probability that the misfire has occurred in the internal combustion engine by using, as an input, time-series data that is an instantaneous speed parameter at each of a plurality of continuous fourth intervals included in a third interval;
the execution device is configured to acquire the instantaneous speed parameter based on a detection value of a sensor that detects a rotation behavior of the crankshaft of the internal combustion engine, in the acquisition process;

the instantaneous speed parameter is a parameter corresponding to a rotation speed of the crankshaft of the internal combustion engine;
the third interval is a rotation angle interval of the crankshaft and includes a compression top dead center;
the fourth interval is an interval smaller than an appearance interval of the compression top dead center; and
the mapping outputs a probability that the misfire has occurred in at least one cylinder in which the compression top dead center appears within the third interval.

4. The state determination device according to claim 1, wherein:
the execution device includes a first execution device and a second execution device;
the first execution device is mounted on a vehicle, and is configured to execute the acquisition process and a vehicle transmission process of transmitting data acquired by the acquisition process to an outside of the vehicle; and
the second execution device is disposed outside the vehicle, and is configured to execute an external reception process of receiving the data transmitted by the vehicle transmission process and the determination process.

5. A data analysis device comprising:
a storage device configured to store mapping data that has been learned by machine learning, the mapping data defining a mapping that outputs a determination result of a state of an internal combustion engine by using an internal combustion engine state variable that is a parameter indicating the state of the internal combustion engine as an input; and
an execution device configured to execute a determination process of determining the state of the internal combustion engine based on an output of the mapping using the internal combustion engine state variable as an input, wherein
the execution device is configured to, when a rotation speed of a crankshaft of the internal combustion engine becomes equal to or higher than a predetermined threshold, omit a part of the determination process performed repeatedly each time the crankshaft rotates by a specified angle and execute the determination process other than the part of the determination process.

6. The state determination device according to claim 4, further comprising:
a control device for the internal combustion engine,
wherein the control device includes the first execution device.

7. The state determination device according to claim 1, wherein the execution device is configured to, when the rotation speed of the crankshaft becomes less than predetermined threshold, perform the part of the determination process.

8. The state determination device according to claim 1, wherein the execution device is configured to, when the rotation speed of the crankshaft becomes equal to or higher than the predetermined threshold, execute the acquisition process for each second specified angle, the second specified angle being larger than the specified angle.

* * * * *